United States Patent
Kim et al.

(10) Patent No.: US 10,142,800 B2
(45) Date of Patent: Nov. 27, 2018

(54) METHOD AND APPARATUS FOR TRANSMITTING UNICAST REQUEST INDICATION IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 15/038,723

(22) PCT Filed: Nov. 13, 2014

(86) PCT No.: PCT/KR2014/010879
§ 371 (c)(1),
(2) Date: May 23, 2016

(87) PCT Pub. No.: WO2015/080407
PCT Pub. Date: Jun. 4, 2015

(65) Prior Publication Data
US 2016/0381517 A1    Dec. 29, 2016

Related U.S. Application Data

(60) Provisional application No. 61/910,120, filed on Nov. 29, 2013.

(51) Int. Cl.
*H04W 4/06*    (2009.01)
*H04W 76/10*   (2018.01)
(Continued)

(52) U.S. Cl.
CPC ............. *H04W 4/06* (2013.01); *H04W 36/08* (2013.01); *H04W 76/10* (2018.02); *H04W 88/02* (2013.01); *H04W 88/08* (2013.01); *H04W 88/16* (2013.01)

(58) Field of Classification Search
CPC ....... H04W 4/06; H04W 36/08; H04W 76/02; H04W 88/02
See application file for complete search history.

(56) References Cited

U.S. PATENT DOCUMENTS 9,635,705 B2 *  4/2017  Lu ................... H04W 84/00
2005/0090278 A1  4/2005  Jeong et al.
(Continued)

FOREIGN PATENT DOCUMENTS

KR   10-2013-0005228 A   1/2013
WO   2012-148206 A2   11/2012
(Continued)

OTHER PUBLICATIONS

PCT International Application No. PCT/KR2014/010879, International Search Report dated Feb. 16, 2015, 1 page.

*Primary Examiner* — Wei Zhao
(74) *Attorney, Agent, or Firm* — Lee, Hong, Degerman, Kang & Waimey

(57) ABSTRACT

A method and apparatus for requesting a unicast bearer setup in a wireless communication system is provided. A user equipment (UE) receives a unicast request indication, which indicates that a target cell does not provide a multimedia broadcast multicast service (MBMS) service in which the UE is interested to the UE, from a network. Upon receiving the unicast request indication, the UE transmits a unicast bearer setup request to the network.

11 Claims, 12 Drawing Sheets

(51) Int. Cl.
*H04W 36/08* (2009.01)
*H04W 88/02* (2009.01)
*H04W 88/08* (2009.01)
*H04W 88/16* (2009.01)

(56) References Cited

U.S. PATENT DOCUMENTS

2014/0286222 A1* 9/2014 Yu ........................... H04W 4/08
                                                          370/312
2015/0365963 A1* 12/2015 Won .................. H04W 28/0268
                                                          370/329
2017/0310497 A1* 10/2017 Kim ...................... H04W 36/06

FOREIGN PATENT DOCUMENTS

| WO | 2013-025033 A2 | 2/2013 |
| WO | 2013-151360 A1 | 10/2013 |

* cited by examiner (a)

(b)

MBMS GW: MBMS Gateway
MCE: Multi-Cell /Multicast Coordination Entity

M1: user plane inter face
M2: E-UTRAN internal control plane interface
M3: control plane interface between E-UTRAN and EPC

METHOD AND APPARATUS FOR TRANSMITTING UNICAST REQUEST INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2014/010879, filed on Nov. 13, 2014, which claims the benefit of U.S. Provisional Application No. 61/910,120, filed on Nov. 29, 2013, the contents of which are all hereby incorporated by reference herein in their entirety.

BACKGROUND OF THE INVENTION

Field of the Invention

The present invention relates to wireless communications, and more particularly, to a method and apparatus for transmitting a unicast request indication in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Public safety networks provide communications for services like police, fire and ambulance. In this realm the requirement has been to develop systems that are highly robust and can address the specific communication needs of emergency services. This has fostered public safety standards that provide for a set of features that were not previously supported in commercial cellular systems. These standards have also been applied to commercial critical communications needs such as airport operations.

Two main areas of 3GPP LTE enhancement have been discussed to address public safety applications. First area is proximity services (ProSe) that identify mobiles in physical proximity and enable optimized communications between them. Second area is group call system enablers that support the fundamental requirement for efficient and dynamic group communications operations such as one-to-many calling and dispatcher working.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

One of the objectives of group communication is to evaluate ability of enhanced MBMS (E-MBMS) or other mechanisms to provide group communication for public safety applications. That is, it has been discussed that group communication for public safety applications may be provided via the E-MBMS or other mechanism. However, a service continuity problem may occur during outbound mobility from a multicast-broadcast single-frequency network (MBSFN) area to a non-MBSFN area. Accordingly, a method for solving the problem described above may be required.

SUMMARY OF THE INVENTION

The present invention provides a method and apparatus for transmitting a unicast request indication in a wireless communication system. The present invention provides a method for transmitting a unicast request indication for service continuity upon mobility. The present invention provides a method for requesting a unicast bearer setup upon receiving a unicast request indication.

In an aspect, a method for requesting, by a user equipment (UE), a unicast bearer setup in a wireless communication system is provided. The method includes receiving a unicast request indication, which indicates that a target cell does not provide a multimedia broadcast multicast service (MBMS) service in which the UE is interested to the UE, from a network, and upon receiving the unicast request indication, transmitting a unicast bearer setup request to the network.

In another aspect, a user equipment (UE) in a wireless communication system is provided. The UE includes a radio frequency (RF) unit for transmitting or receiving a radio signal, and a processor coupled to the RF unit, and configured to receive a unicast request indication for group communication, which indicates that a target cell does not provide a multimedia broadcast multicast service (MBMS) service in which the UE is interested to the UE, from a network, and upon completing a handover procedure, transmit a unicast bearer setup request for group communication to the network.

Service interruption time for mobility from a multicast-broadcast single-frequency network (MBSFN) area to a non-MBSFN area can be reduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
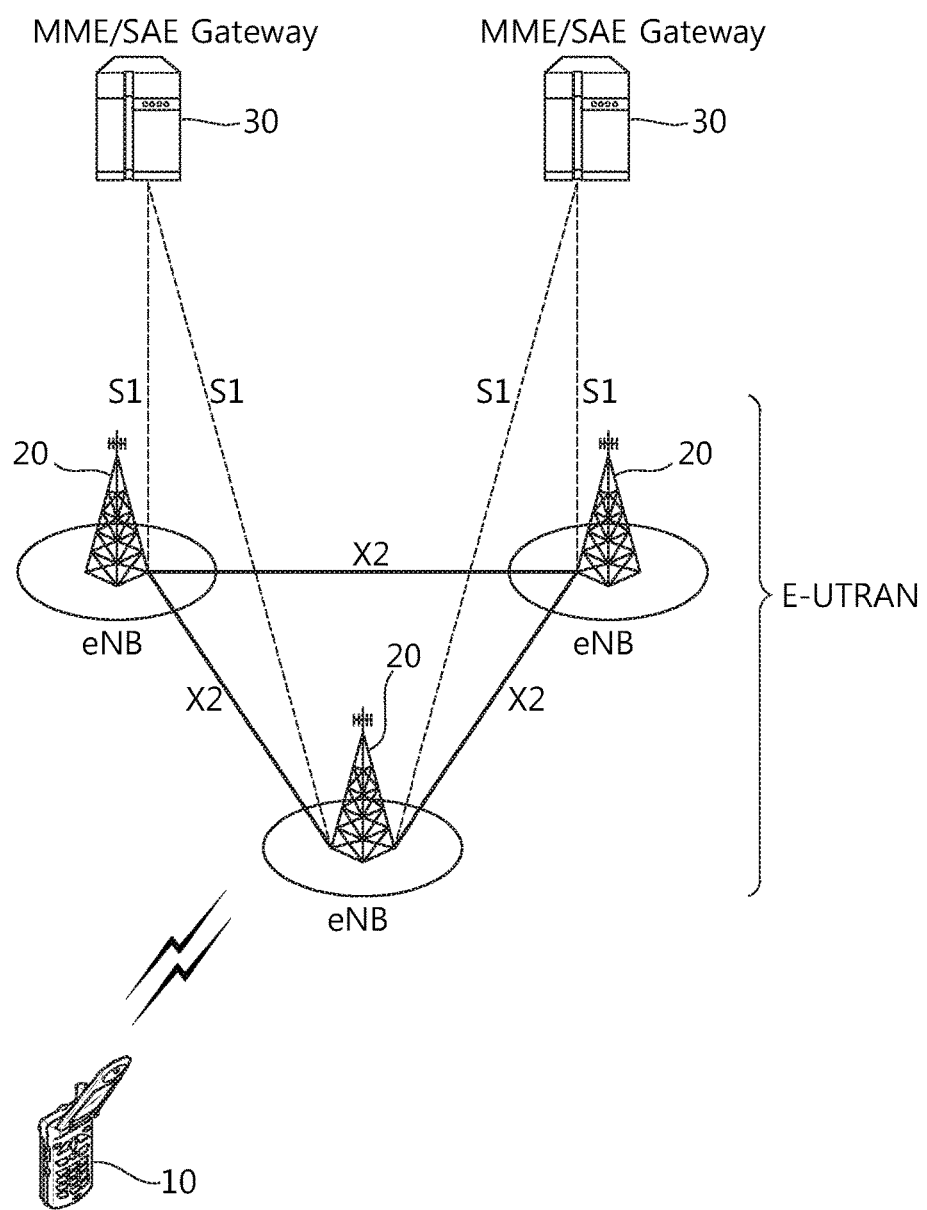
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
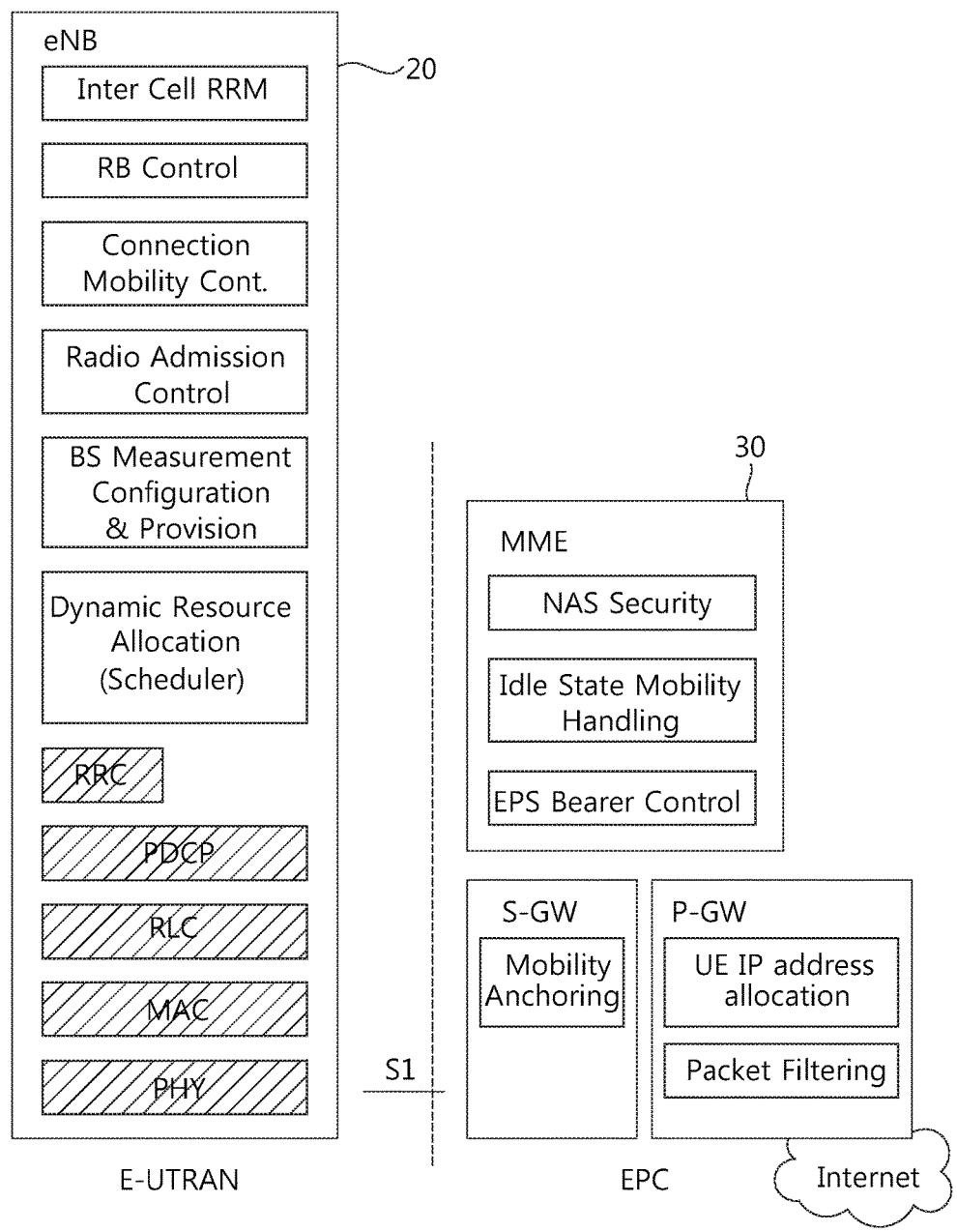
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
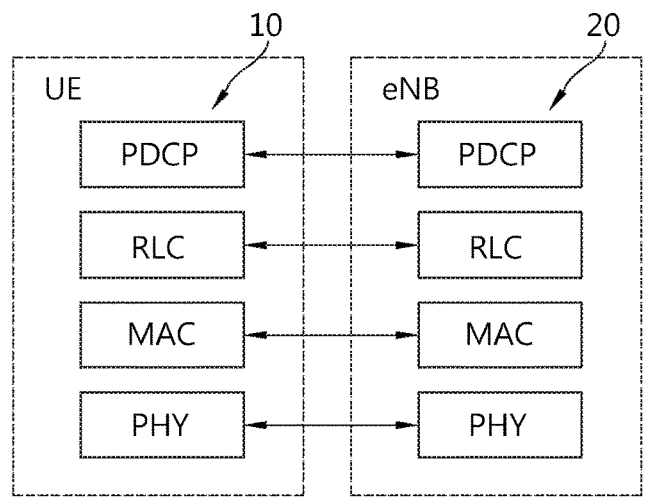
FIG. 3 shows a block diagram of a user plane protocol stack and a control plane protocol stack of an LTE system.
Figure 3:
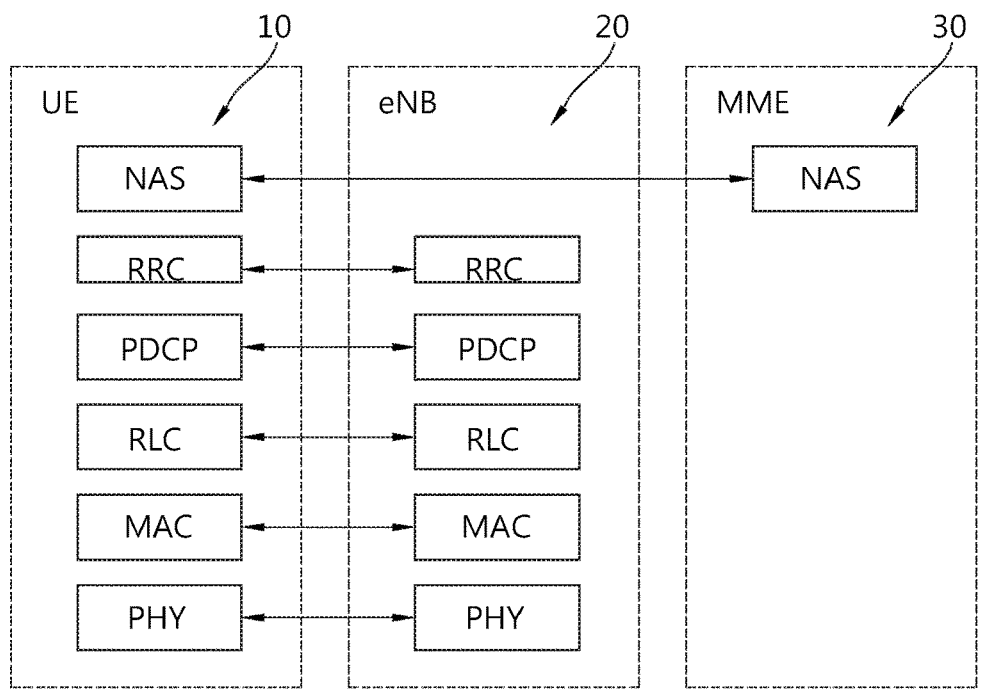

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
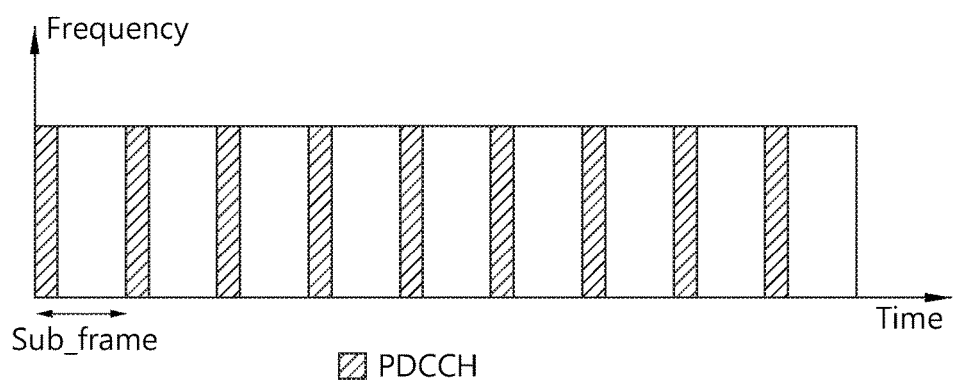
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Multimedia broadcast multicast services (MBMS) are described. It may be referred to Section 15 of 3GPP TS 36.300 V11.7.0 (2013-09).

Figure 5:
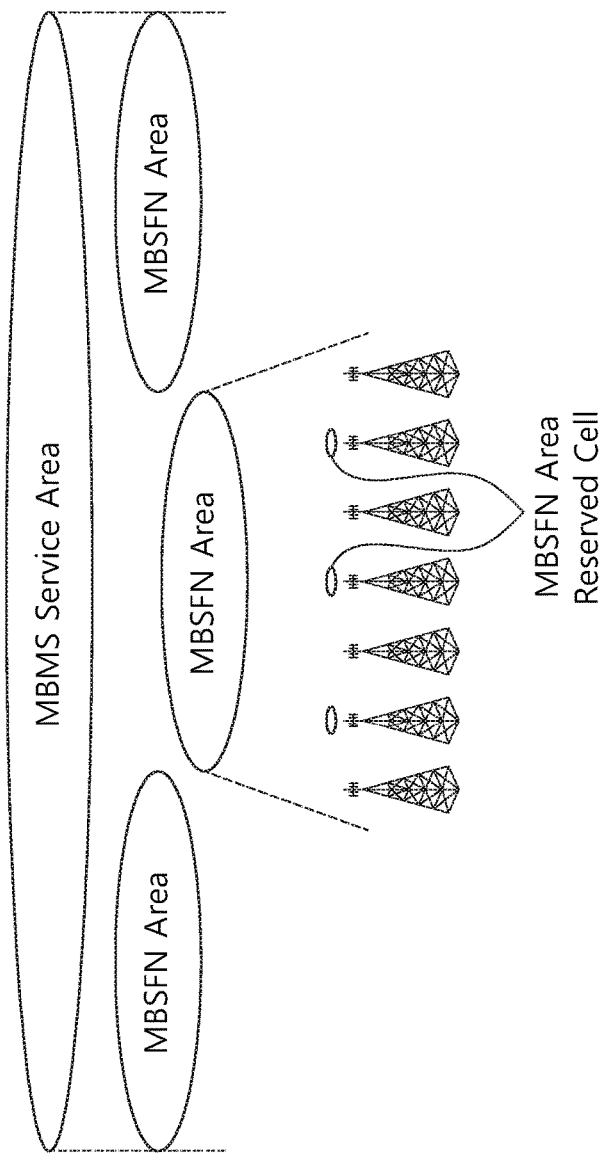
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

In E-UTRAN, MBMS can be provided with single frequency network mode of operation (MBSFN) only on a frequency layer shared with non-MBMS services (set of cells supporting both unicast and MBMS transmissions, i.e., set of "MBMS/Unicast-mixed cells").

MBMS reception is possible for UEs in RRC_CONNECTED or RRC_IDLE states. Whenever receiving MBMS services, a user shall be notified of an incoming call, and originating calls shall be possible. Robust header compression (ROHC) is not supported for MBMS.

Figure 6:
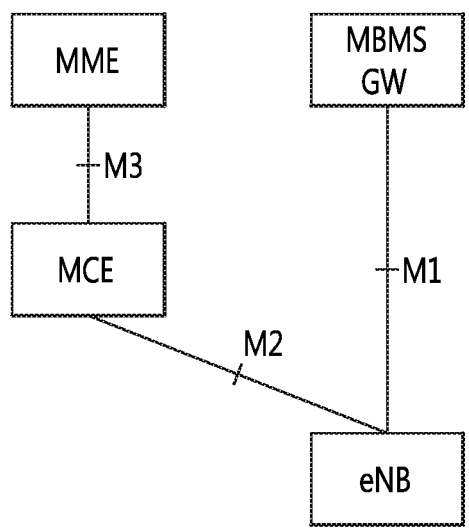
FIG. 6 shows an enhanced MBSM (E-MBMS) logical architecture.

FIG. 6 shows an enhanced MBSM (E-MBMS) logical architecture. 3GPP LTE may support the MBMS, and 3GPP LTE-A may support the E-MBMS.

Referring to FIG. 6, the MCE is connected with the eNB via M2 interface, and with the MME via M3 interface. The MCE is a logical entity. The MCE may be a part of another network element. The functions of the MCE are as follows.

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to allocation and retention priority (ARP). Besides allocation of the time/frequency radio resources this also includes deciding the further details of the radio configuration, e.g., the modulation and coding scheme.

counting and acquisition of counting results for MBMS service(s).

resumption of MBMS session(s) within MBSFN area(s) based on, e.g., the ARP and/or the counting results for the corresponding MBMS service(s).

suspension of MBMS session(s) within MBSFN area(s) based on, e.g., the ARP and/or on the counting results for the corresponding MBMS service(s).

The MCE is involved in MBMS session control signaling. The MCE does not perform UE-MCE signaling. An eNB is served by a single MCE.

The MBMS GW is a logical entity. The MBMS GW may be a part of another network element. The MBMS G is present between the BMSC and eNBs whose principal functions is the sending/broadcasting of MBMS packets to each eNB transmitting the service. The MBMS GW uses IP multicast as the means of forwarding MBMS user data to the eNB. The MBMS GW performs MBMS session control signaling (session start/update/stop) towards the E-UTRAN via the MME.

The M3 interface is a control plane interface which connects between the MCE and MME. An application part is defined for this interface between the MME and MCE. This application part allows for MBMS session control signaling on E-UTRAN radio access bearer (E-RAB) level (i.e., does not convey radio configuration data). The procedures comprise, e.g., MBMS session start and stop. Stream control transmission protocol (SCTP) is used as signaling transport i.e., point-to-point signaling is applied.

The M2 interface is a control plane interface which connects between the MCE and eNB. An application part is defined for this interface, which conveys at least radio configuration data for the multi-cell transmission mode eNBs and session control signaling. SCTP is used as signaling transport, i.e., point-to-point signaling is applied.

The M1 interface is a pure user plane interface which connects the MBMS GW and eNB. Consequently no control plane application part is defined for this interface. IP multicast is used for point-to-multipoint delivery of user packets.

MBMS service continuity is described. Mobility procedures for MBMS reception allow the UE to start or continue receiving MBMS service(s) via MBSFN when changing cell(s). The E-UTRAN procedures provide support for service continuity with respect to mobility within the same MBSFN area. Within the same geographic area, MBMS services can be provided on more than one frequency and the frequencies used to provide MBMS services may change from one geographic area to another within a PLMN.

UEs that are receiving MBMS service(s) in RRC_IDLE performing cell reselection or are in RRC_CONNECTED obtain target cell MTCH information from the target cell MCCH.

To avoid the need to read MBMS related system information and potentially MCCH on neighbor frequencies, the UE is made aware of which frequency is providing which MBMS services via MBSFN through the combination of the following MBMS assistance information:

User service description (USD): In the USD, the application/service layer provides for each service the temporary mobile group identity (TMGI), the session start and end time, the frequencies and the MBMS service area identities (MBMS SAIs) belonging to the MBMS service area System information: MBMS and non-MBMS cells indicate in SystemInformationBlockType15 the MBMS SAIs of the current frequency and of each neighbour frequency.

The MBMS SAIs of the neighboring cell may be provided by X2 signaling (i.e., X2 setup and eNB configuration update procedures) or/and operations, administration and maintenance (OAM)

When applying the procedures described below for UEs in RRC_IDLE and RRC_CONNECTED state:

the UE does not need to verify that a frequency is providing a MBMS service by acquiring MCCH and may apply these procedures even though a MBMS service is not provided via MBSFN;

the UE may consider that a service is provided if a session of this service is ongoing as derived from the session start and end times indicated for this service in the USD and if a frequency provides this service;

the UE determines the frequency on which a service is provided according to the following:

if the serving cell provides SystemInformationBlockType15, the UE considers that a frequency is providing the MBMS service via MBSFN if and only if one of the MBMS SAI(s) of this frequency as indicated in SystemInformationBlockType15 of the serving cell is indicated for this MBMS service in the USD;

if the serving cell does not provide SystemInformationBlockType15, the UE in RRC_IDLE may consider that a frequency included in the USD for the MBMS service is providing this MBMS service as long as the UE reselects cells where SystemInformationBlockType13 is provided.

In RRC_IDLE, the UE applies the normal cell reselection rules with the following modifications:

the UE which is receiving MBMS service(s) via MBSFN and can only receive these MBMS service(s) via MBSFN while camping on the frequency providing these MBMS service(s) is allowed to make this frequency highest priority;

the UE which is interested in receiving MBMS service(s) via MBSFN and can only receive these MBMS service(s) via MBSFN while camping on the frequency providing these MBMS service(s) is allowed to make this frequency highest priority when it intends to receive these MBMS service(s);

when the MBMS service(s) which the UE is interested in are no longer available (after the end of the session) or the UE is no longer interested in receiving the service(s), the UE no longer prioritises the frequency providing these MBMS service(s);

In RRC_CONNECTED, the UE that is receiving or interested to receive MBMS via MBSFN informs the network about its MBMS interest via an RRC message and the network does its best to ensure that the UE is able to receive MBMS and unicast services subject to the UE's capabilities:

the UE indicates the frequencies which provide the service(s) that the UE is receiving or is interested to receive simultaneously, and which can be received simultaneously in accordance with the UE capabilities;

the UE indicates its MBMS interest at RRC connection establishment (the UE does not need to wait until AS security is activated), and whenever the set of frequencies on which the UE is interested in receiving MBMS services has changed compared with the last indication sent to the network (e.g., due to a change of user interest or of service availability);

the UE may only indicate its interest when the primary cell (PCell) provides SystemInformationBlockType15 and after having acquired SystemInformationBlockType15 of the current PCell;

the UE may indicate its MBMS interest even if the current configured serving cell(s) do not prevent it from receiving the MBMS services it is interested in;

the UE indicates with a single bit whether it prioritises MBMS reception over unicast. This priority indication applies to all unicast bearers and all MBMS frequencies. It is sent whether the MBMS frequencies are congested or not.

the E-UTRAN reuses the SupportedBandCombination IE to derive the UEs MBMS related reception capabilities, i.e., the E-UTRAN tries to ensure that the UE is able to receive MBMS and unicast bearers by providing them on the frequencies indicated in SupportedBandCombination IE signalled by the UE. The UE shall support MBMS reception on any serving cell and on any cell that may be additionally configured as serving cell according to the UE capabilities for unicast reception;

for handover preparation, the source eNB transfers the MBMS interest of the UE, if available, to the target eNB. After handover, the UE reads SystemInformationBlockType15 before updating its MBMS interest. If SystemInformationBlockType15 is provided on the target cell but not on the source cell, the UE indicates its MBMS interest after handover.

If MBMS is prioritized and the unicast connection cannot be maintained because of congestion on the MBMS carrier then the E-UTRAN releases unicast bearers. It is left to E-UTRAN implementation whether all bearers or only guaranteed bit rate (GBR) bearers are released. The E-UTRAN does not trigger re-establishment of the released unicast bearers. For congestion control, the E-UTRAN can rely on existing access control mechanisms.

The E-UTRAN may take into account the UE priority for MBMS or unicast reception when receiving an indication of proximity to a closed subscriber group (CSG) cell from a UE which also indicated interest in MBMS reception (or vice-versa).

MBMS interest indication is described. It may be referred to Section 5.8.5 of 3GPP TS 36.331 V11.5.0 (2013-09). The purpose of this procedure is to inform the E-UTRAN that the UE is receiving or is interested to receive MBMS via an MBMS radio bearer (MRB), and if so, to inform the E-UTRAN about the priority of MBMS versus unicast reception.

Figure 7:
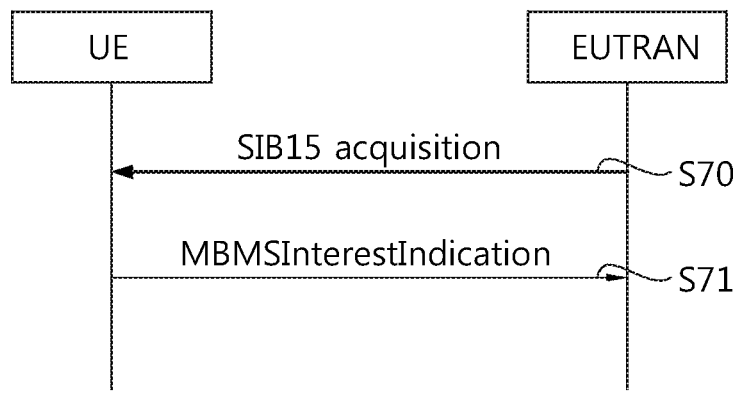
FIG. 7 shows an MBMS interest indication procedure.

FIG. 7 shows an MBMS interest indication procedure. An MBMS capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a PCell broadcasting SystemInformationBlockType15.

Upon initiating the procedure, the UE shall:

1> if SystemInformationBlockType15 is broadcast by the PCell in step S70:

2> ensure having a valid version of SystemInformationBlockType15 for the PCell;

2> if the UE did not transmit an MBMSInterestIndication message since last entering RRC_CONNECTED; or 2> if since the last time the UE transmitted an MBMSInterestIndication message, the UE connected to a PCell not broadcasting SystemInformationBlockType15:

3> if the set of MBMS frequencies of interest is not empty:

4> initiate transmission of the MBMSInterestIndication message;

2> else:

3> if the set of MBMS frequencies of interest has changed since the last transmission of the MBMSInterestIndication message; or 3> if the prioritization of reception of all indicated MBMS frequencies compared to reception of any of the established unicast bearers has changed since the last transmission of the MBMSInterestIndication message:

4> initiate transmission of the MBMSInterestIndication message.

The UE may send an MBMSInterestIndication even when it is able to receive the MBMS services it is interested in i.e. to avoid that the network allocates a configuration inhibiting MBMS reception.

To determine MBMS frequencies of interest, the UE shall:

1> consider a frequency to be part of the MBMS frequencies of interest if the following conditions are met:

2> at least one MBMS session the UE is receiving or interested to receive via an MRB is ongoing or about to start; and 2> for at least one of these MBMS sessions SystemInformationBlockType15 acquired from the PCell includes for the concerned frequency one or more MBMS SAIs as indicated in the USD for this session; and 2> the UE is capable of simultaneously receiving the set of MBMS frequencies of interest, regardless of whether a serving cell is configured on each of these frequencies or not; and 2> the supportedBandCombination the UE included in UE-EUTRA-Capability contains at least one band combination including the set of MBMS frequencies of interest.

Indicating a frequency implies that the UE supports SystemInformationBlockType13 acquisition for the concerned frequency, i.e., the indication should be independent of whether a serving cell is configured on that frequency. When evaluating which frequencies it can receive simultaneously, the UE does not take into account the serving frequencies that are currently configured, i.e., it only considers MBMS frequencies it is interested to receive.

The UE shall set the contents of the MBMSInterestIndication message as follows:

1> if the set of MBMS frequencies of interest is not empty:

2> include mbms-FreqList and set it to include the MBMS frequencies of interest, using the E-UTRA absolute radio frequency channel number (EARFCN) corresponding with freqBandIndicator included in SystemInformationBlockType1, if applicable, and the EARFCN(s) as included in SystemInformationBlockType15;

2> include mbms-Priority if the UE prioritizes reception of all indicated MBMS frequencies above reception of any of the unicast bearers.

If the UE prioritizes MBMS reception and unicast data cannot be supported because of congestion on the MBMS carrier(s), the E-UTRAN may initiate release of unicast bearers. It is up to E-UTRAN implementation whether all bearers or only GBR bearers are released. The E-UTRAN does not initiate re-establishment of the released unicast bearers upon alleviation of the congestion.

The UE shall submit the MBMSInterestIndication message to lower layers for transmission. Accordingly, in step S71, the UE transmits the MBMSInterestIndication message to the E-UTRAN.

Group communication is described. It may be referred to 3GPP TR 23.768 V0.3.0 (2013-07). A few terms may be defined for supporting group communication service enabler (GCSE) or GCSE over LTE (GSCE_LTE). GCSE group is a set of members that are entitled to participate in a group communication service. Multipoint service is a service, which is offered to the GCSE application server (AS) and used to distribute the same group communication data to the UEs of a GCSE Group in a resource efficient way. Multicast delivery is a delivery mode where the group communication data is delivered via shared network resources to multiple group members. Unicast delivery is a delivery mode where the group communication data is delivered to a particular group member via resources dedicated to a group member.

Figure 8:
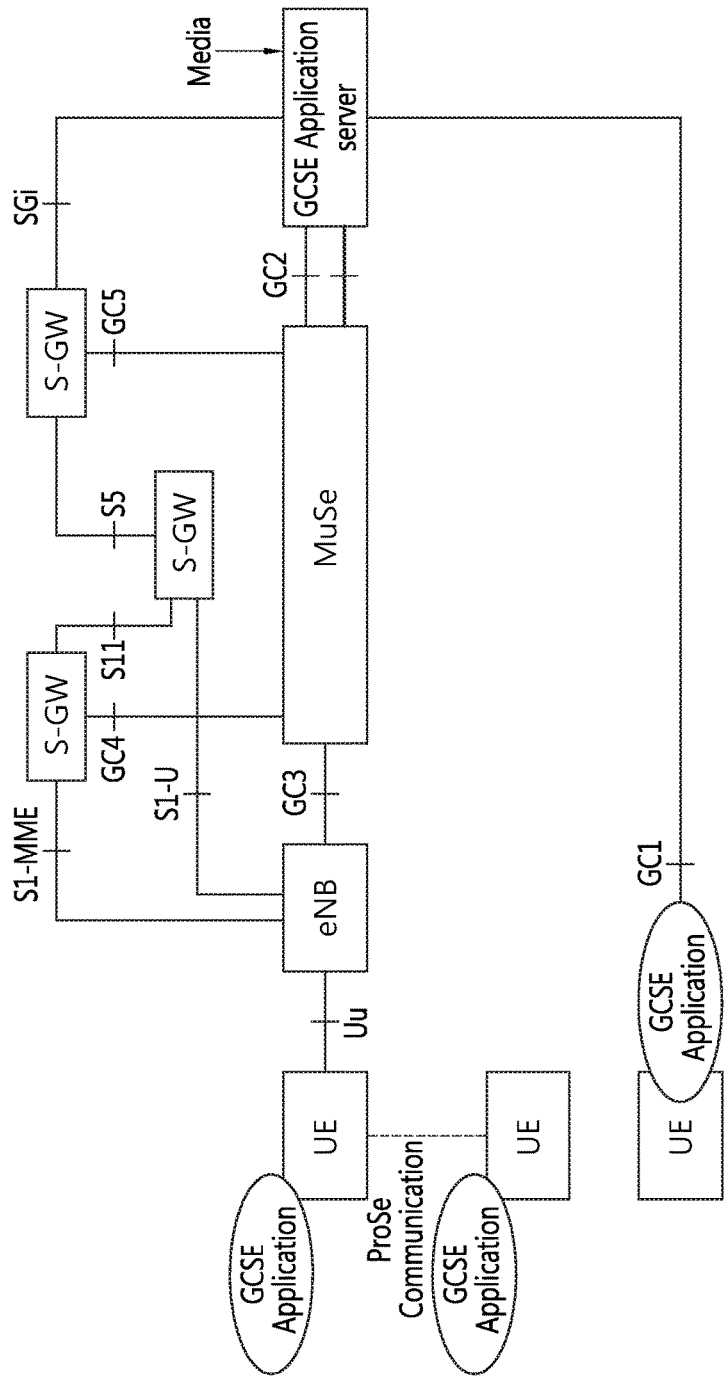
FIG. 8 shows overall of high level architecture view for GCSE_LTE.

FIG. 8 shows overall of high level architecture view for GCSE_LTE. Referring to FIG. 8, the high-level architecture consists of application layer and 3GPP evolved packet system (EPS) layer. The application layer consists of GCSE AS. The 3GPP EPS layer consists of a MuSe function. The MuSe function interworks with the 3GPP EPS entities to provide the multipoint service functionality.

There are a few reference points in the high level architecture for GCSE_LTE.

GC1: It is the reference point between the GCSE application in the UE and in the GSCE AS. It is used to define application level signaling requirement to enable multipoint functionality for GCSE_LTE, and possibly for session establishment and floor control usages, etc.

GC2: It is the reference point between the GCSE AS and the MuSe function. It is used to define the interaction between GCSE AS and MuSe functionality provided by the 3GPP EPS layer.

GC3: It is the reference point between the E-UTRAN and MuSe function. It is used to define the interaction between E-UTRAN and MuSe function in order to achieve multipoint functionality provided by the 3GPP EPS layer.

GC4: It is the reference point between the MME and MuSe function. It is used to define the interaction between MME and MuSe function in order to achieve multipoint functionality provided by the 3GPP EPS layer.

GC5: It is the reference point between the P-GW and MuSe function. It is used to provide DL unicast service by MuSe.

The architecture described above shall allow as an option for the GCSE AS to determine whether to deliver the group call data using unicast delivery or multicast delivery or both.

Figure 9:
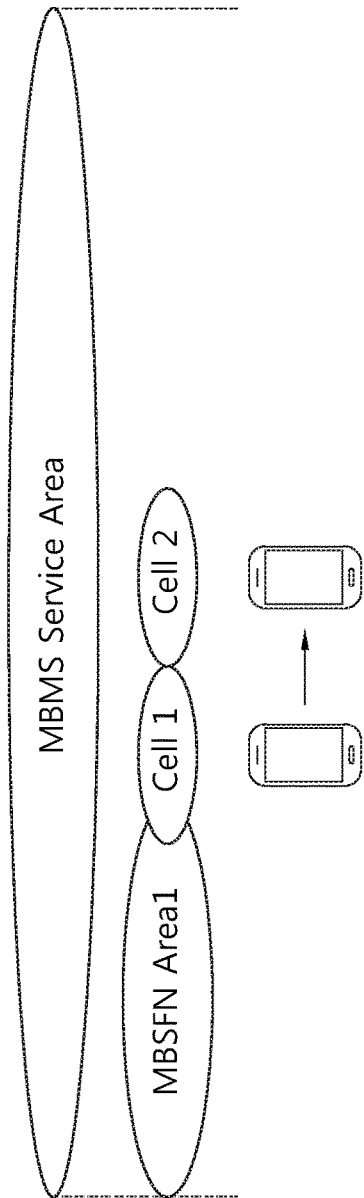
FIG. 9 shows an example of service continuity during outbound mobility from an MBFSN area to a non-MBSFN area.

FIG. 9 shows an example of service continuity during outbound mobility from an MBFSN area to a non-MBSFN area. Referring to FIG. 9, the UE is connected to the cell 1 in the MBSFN area 1 and receives the MBSFN service of interest. It is assumed that the MBSFN service carries group communication. The UE is handed over to the cell 2 (intra-frequency) which is out of the scope of MBSFN area 1, and then, the UE may find that the cell 2 is out of the scope of MBSFN area 1 after reading SIB13 in the cell 2. The UE reads SIB15 in the cell 2 and may find no suitable frequency to continue receiving the MBMS service of interest. Accordingly, the UE may trigger the unicast bearer setup via application level signaling to continue receiving the group communication over unicast. In this case, the UE may undergo service interruption at any time, depending on the MBSFN signal quality in MBSFN area edge and UE capability. Table 1 shows service interruption time for the mobility from the MBSFN area to the non-MB SFN area.

TABLE 1

| Component | Time | Comments |
| --- | --- | --- |
| MIB reading delay on Cell2 | 40 ms | |
| SIB1 reading delay on Cell2 | 80 ms | |
| SIB2, SIB13 and SIB15 reading delay on Cell2 | 160 ms | Assuming SIB13/15 scheduling periodicity is 320 ms, and SIB2 scheduling periodicity is shorter. |
| State transition delay from RRC_IDLE to RRC_CONNECTED | 80 ms | Section B.1.1.1 of TR 36.912 |
| Dedicated bearer for VoIP establishment | 115 ms | Section 5.1.1.1 of TR 36.868 |
| Total delay | 475 ms | |

Referring to Table 1, around 500 ms service interruption time may be observed for the mobility from the MBSFN area to the non-MBSFN area. This service interruption time is not suitable for interruption sensitive service, e.g., group communication or MBMS service for public safety. Accordingly, a method for reducing the service interruption time for group communication may be required.

Hereinafter, a method for requesting a unicast bearer setup according to an embodiment of the present invention is described. According to an embodiment of the present invention, the network transmits a unicast request indication which means a target cell does not provide an interested MBMS service over an MRB to the UE, and the UE requests a unicast bearer setup to the network to continue receiving the interested MBMS service over a unicast bearer. Accordingly, the service interruption time for the mobility from the MBSFN area to the non-MB SFN area can be reduced.

Figure 10:
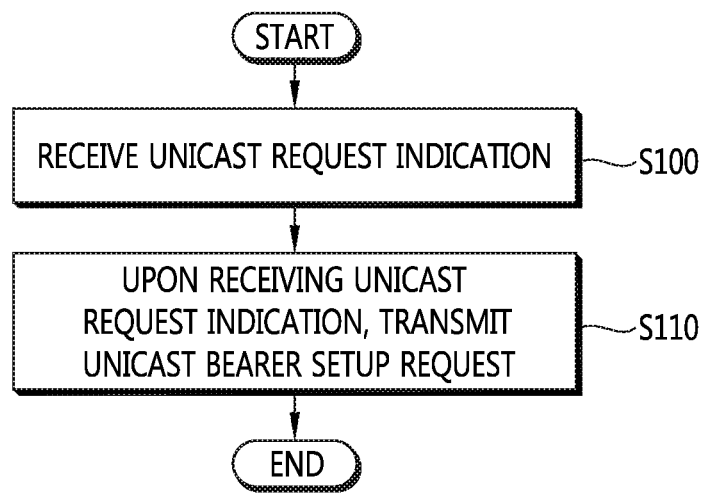
FIG. 10 shows an example of a method for requesting a unicast bearer setup according to an embodiment of the present invention.

FIG. 10 shows an example of a method for requesting a unicast bearer setup according to an embodiment of the present invention.

In step S100, the UE receives a unicast request indication, which indicates that a target cell does not provide an MBMS service in which the UE is interested over an MRB to the UE, from the network. The unicast request indication may be received from a serving cell of the network. The unicast request indication may be received via a handover command message, i.e., the RRCConnectionReconfiguration message including mobilityConltolInfo. The unicast request indication may be applied only for a specific MBMS service, e.g., group communication or MBMS service for public safety.

In step S110, upon receiving the unicast request indication from the network, the UE transmits a unicast bearer setup request to the network, in order to continue receiving the interested MBMS service over a unicast bearer. The unicast bearer setup request may be transmitted to the target cell and/or the group communication service enabler application server (GCSE-AS) of the network. The unicast bearer setup request may be transmitted via a handover complete message, i.e., the RRCConnectionReconfigurationComplete message.

The unicast request indication may be received for each interested MBMS service of the UE. That is, the network may inform the UE of the interested MBMS service which is not provided over the MRB in the target cell by the unicast request indication. If the UE receives the unicast request indication for each interested MBMS service, the UE may request the unicast bearer setup for the MBMS service, indicated by the unicast request indication, via the handover complete message.

Alternatively, the unicast request indication may be received for each MBSFN area. That is, the network may inform the UE of the MBSFN area to which the target cell does not belong by the unicast request indication. If the UE receives the unicast request indication for each MBSFN area, the UE may request the unicast bearer setup for interested MBMS service which is provided in the MBSFN area, indicated by the unicast request indication, via the handover complete message.

Upon transmitting the unicast bearer setup request to the network, the UE may receives the MBMS service in which the UE is interested over a unicast bearer, which is set up by the unicast bearer setup request. Accordingly, the UE can continue receiving the interested MBMS service over a unicast bearer, without significant service interruption time.

Figure 11:
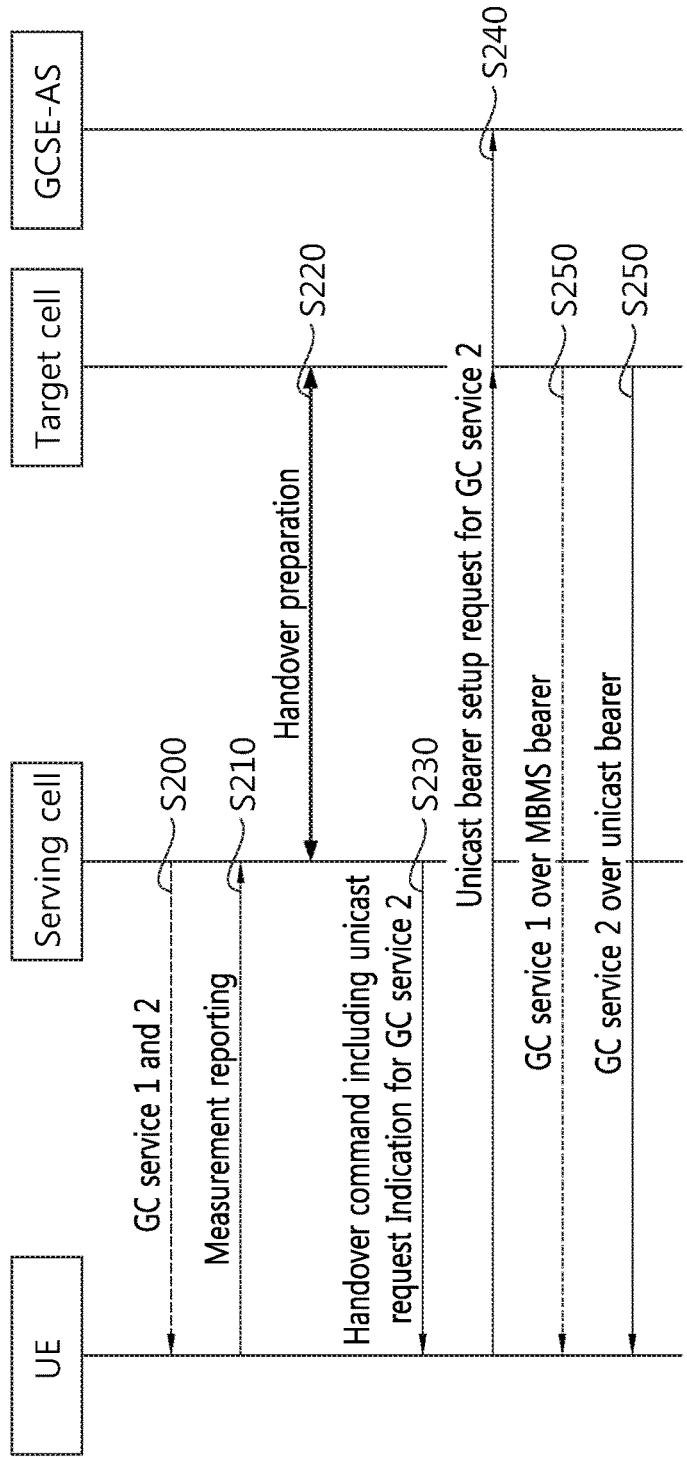
FIG. 11 shows another example of a method for requesting a unicast bearer setup according to an embodiment of the present invention.

FIG. 11 shows another example of a method for requesting a unicast bearer setup according to an embodiment of the present invention.

In step S200, the UE is connected to a serving cell and receives GC service 1 and 2 over the MRB. It is assumed that the GC service 1 and 2 are provided in MBSFN area #1 and #2, respectively and the serving cell belongs to both MBSFN area #1 and #2. In step S210, the UE transmits the measurement report to the network.

In step S220, the serving cell performs handover preparation procedure with the target cell. It is assumed that the target cell belongs to only MBSFN area #1, so the GC service 2 is not provided over the MRB in the coverage of the target cell.

In step S230, the serving cell transmits a handover command message including a unicast request indication for the GC service 2 to the UE. In step S240, upon completing the handover procedure, the UE requests a unicast bearer setup for the GC service 2 to the target cell. The unicast bearer setup request is also transmitted to the GCSE application server.

In step S250, the UE receives the GC service 1 over the MRB and receives the GC service 2 over the unicast bearer.

Figure 12:
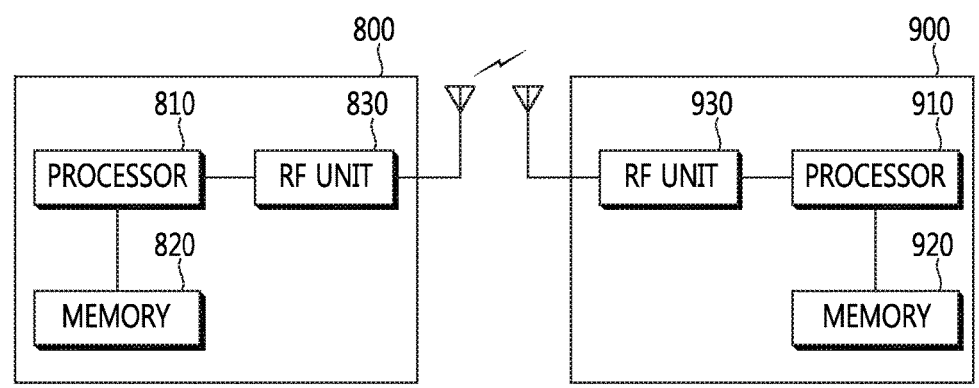
FIG. 12 shows a wireless communication system to implement an embodiment of the present invention.

FIG. 12 shows a wireless communication system to implement an embodiment of the present invention.

An entity of a network 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for requesting, by a user equipment (UE), a unicast bearer setup in a wireless communication system, the method comprising:
    receiving a unicast request indication via a handover command message, which indicates that a target cell does not provide a multimedia broadcast multicast service (MBMS) service in which the UE is interested to the UE, from a serving cell of a network; and
    upon receiving the unicast request indication, transmitting a unicast bearer setup request to the target cell of the network via a handover complete message.

2. The method of claim 1, wherein the unicast bearer setup request is transmitted to the target cell and a group communication service enabler application server (GCSE-AS) of the network.

3. The method of claim 1, wherein the unicast request indication is received for each MBMS service in which the UE is interested.

4. The method of claim 3, wherein the unicast bearer setup request is transmitted for the MBMS service indicated by the unicast request indication.

5. The method of claim 1, wherein the unicast request indication is received for each multicast-broadcast single-frequency network (MBSFN) area.

6. The method of claim 5, wherein the unicast request indication is transmitted for the MBMS service which is provided in the MBSFN area indicated by the unicast request indication.

7. The method of claim 1, wherein the unicast request indication is applied for a specific MBMS service.

8. The method of claim 7, wherein the specific MBMS service is an MBMS service for group communication or public safety.

9. The method of claim 1, further comprising:
    upon transmitting the unicast bearer setup request, receiving the MBMS service in which the UE is interested over a unicast bearer, which is set up by the unicast bearer setup request.

10. A user equipment (UE) in a wireless communication system, the UE comprising:
    a radio frequency (RF) unit for transmitting or receiving a radio signal; and
    a processor coupled to the RF unit, and configured to:
    receive a unicast request indication for group communication via a handover command message, which indicates that a target cell does not provide a multimedia broadcast multicast service (MBMS) service in which the UE is interested to the UE, from a serving cell of a network; and
    upon completing a handover procedure, transmit a unicast bearer setup request for group communication to the target cell of the network via a handover complete message.

11. The UE of claim 10, wherein the unicast bearer setup request is transmitted to the target cell and a group communication service enabler application server (GCSE-AS) of the network.

* * * * *